I. E. PALMER.

COUCH HAMMOCK.

APPLICATION FILED MAR. 21, 1911.

Reissued Aug. 15, 1911. 13,282.

*Witnesses:*

Horace A. Crossman

Carl L. Choate

*Inventor:*

Isaac E. Palmer by Ernest Bond Janey & Varney

Attys

COLUMBIA PLANOGRAPH CO., WASHINGTON, D. C.

UNITED STATES PATENT OFFICE.

ISAAC E. PALMER, OF MIDDLETOWN, CONNECTICUT, ASSIGNOR TO THE I. E. PALMER CO., OF MIDDLETOWN, CONNECTICUT, A CORPORATION OF CONNECTICUT.

COUCH-HAMMOCK.

13,282. Specification of Reissued Letters Patent. Reissued Aug. 15, 1911.

Original application filed March 28, 1908, Serial No. 423,915. Divided and application filed January 14, 1909, Serial No. 472,193. Original No. 917,650, dated April 6, 1909. Application for reissue filed March 21, 1911. Serial No. 616,032.

*To all whom it may concern:*

Be it known that I, ISAAC E. PALMER, a citizen of the United States, residing at Middletown, in the county of Middlesex and State of Connecticut, have invented an Improvement in Couch-Hammocks, of which the following description, in connection with the accompanying drawings, is a specification, like numerals on the drawings representing like parts.

This invention relates to hammocks of the type wherein a frame is adapted to be applied to the body of the hammock in such manner as to interrupt the natural curve of the body, or to provide a framed hammock, the hammock being of the general type set forth in my Patent No. 574,073, December 29, 1896.

This application is a division of my copending application Serial No. 423,915.

Figure 1:
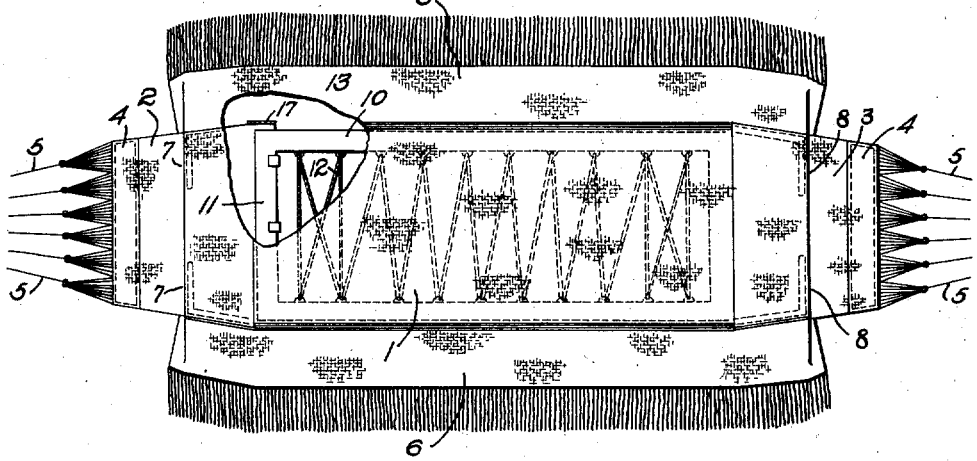
Figure 2:
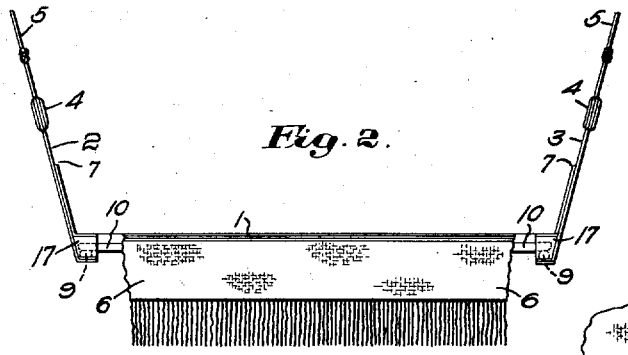
Figure 3:
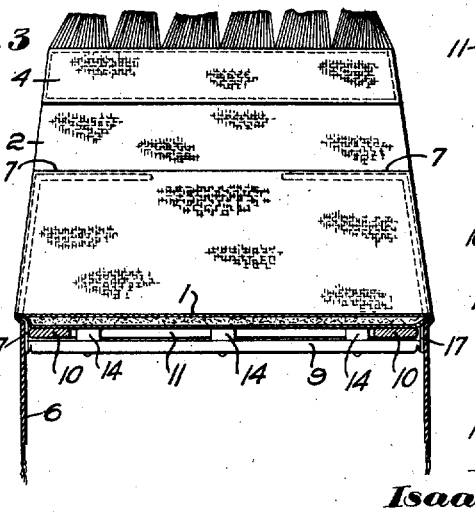
Figure 4:
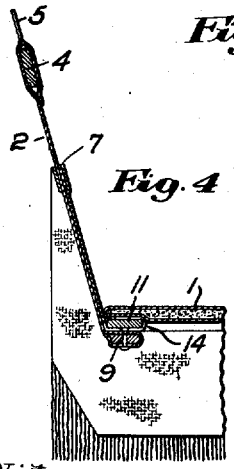
Figure 5:
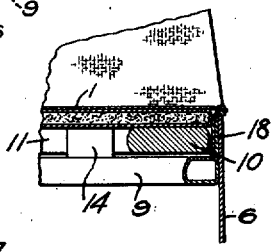
Figure 6:
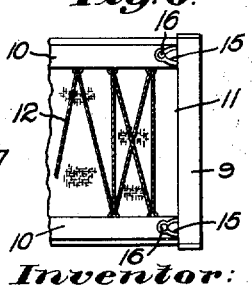

In order that the principles of the invention may be clearly understood, I have set forth a single type or embodiment thereof in the accompanying drawings, wherein:

Figure 1 is a plan view representing, with the parts distended, a hammock embodying my invention, a portion thereof being broken away more clearly to indicate the construction of frame. Fig. 2 is a side elevation of the hammock represented in Fig. 1 when suspended for use. Fig. 3 is a transverse vertical section of a hammock shown in Fig. 1 upon the line 3—3 thereof and looking toward the left in said figure. Fig. 4 is a detail representing in vertical longitudinal section the end portion of the hammock shown in Fig. 1. Fig. 5 is a detail in vertical transverse section of a slightly modified construction; and Fig. 6 is a detail in plan of a slightly modified construction of parts for securing the frame in supported position.

Referring more particularly to the single type or embodiment of my invention herein selected for illustration, the body of the hammock is preferably composed of a main body portion 1 of suitable material and preferably of cloth, and end portions 2 and 3 suitably secured thereto and preferably provided with spreaders 4—4 and any suitable means, such as indicated at 5—5, whereby the hammock may be suspended. If desired, the hammock may be provided at each side with a valance 6 secured thereto in any suitable manner. In the present type of the invention, the end parts of the main body portion 1 are adapted to overlie the inner terminal parts of the end members 2 and 3. Herein, the said main body portion and the respective end members are represented as secured by transverse lines of stitching 7 and 8, which may be interrupted throughout a portion of their extent, as at the intermediate portion and as illustrated in Fig. 1, in order to provide pockets upon the inner faces of the end portions. I contemplate in the present type of the invention the provision of means whereby a frame adapted when positioned to interrupt the natural curvature of the hammock may be applied to the body thereof by relative longitudinal movement of said frame and body. In the present type of the invention, I accomplish this result by providing end pockets wherein the end portions of the frame may be received, and if desired secured, and I further, in this embodiment of the invention, so locate said pockets that the frame may be applied to the under side of the main body portion and be supported thereagainst. It is apparent that this result may be accomplished in any desired manner. Herein, however, I accomplish the purpose by providing pockets at the meeting parts of the main body and end portions. The lower wall of the pocket is furnished by the inner edge or part of each end portion. As represented most clearly in Figs. 2 and 3, I secure to such inner edge or part of each end portion a spreader 9 in any usual or desired manner, as, for example, in a hem at such edge. If desired, the lateral edges of the overlapping parts of the main body and end portions may remain unattached throughout a portion of their extent, thereby affording lateral access to the pockets spaced between said overlapping parts, thus permitting if desired the insertion of a pillow or other article laterally at such point.

Any suitable type of frame may be applied to the hammock to interrupt the natural curvature thereof. In the present embodiment of the invention, I have represented (see particularly Fig. 1) a rectangular frame composed of longitudinal members 10 and transverse end members 11. A seating for the frame may be provided in any suitable manner. Herein, I have represented a cord 12 laced back and forth through suitable eyes 13 secured to the longitudinal members of the frame. It is to be understood, however, that any suitable seating may be provided, as, for example, a seating such as shown in my Patent No. 901,936, October 20, 1908.

The ends of the frame are adapted to be inserted in the pockets formed in the body of the hammock, and if desired means may be provided to secure the frame therein. While any suitable construction may be provided for the purpose, I have herein represented (see Figs. 1, 3 and 4) hooks 14 secured to the spreaders 9 and having their ends directed toward the ends of the hammock, so that the frame when engaged thereby may be held from longitudinal movement in the pockets. In Fig. 6, I have shown a slightly modified construction for holding the frame in the pockets consisting of metallic strips 15 having key hole slots therein to engage screws 16 secured in the upper face of the frame. If desired, I may provide means to prevent lateral movement of the frame in the pockets. It is apparent that this may be accomplished in any suitable manner. It will be obvious that the hooks 14, metallic strips 15 or other substitutes are secured both to the frame and to the hammock body or suspension ends, being detachably secured to at least one of said parts.

In Fig. 3, I have represented a portion of the overlapping ends of the main body portion and the underlying end portions as provided with patches 17 stitched to said parts, said patches defining the lateral extent of the pockets. If desired, however, the upper and lower walls of each pocket herein consisting of the main body portion and the end portions may be directly stitched together, as represented at 18 in Fig. 5, wherein the fabric of the lower member is extended upwardly and secured to that of the main body member.

It is apparent that the frame may be readily removed or detached from the body of the hammock, either for reversal or inverting of the frame, or for purposes of shipment or storage.

Having thus described one type or embodiment of my invention, I desire it to be understood that although specific terms are employed, they are used in a generic and descriptive sense and not for purposes of limitation, the scope of the invention being set forth in the following claims.

Claims:

1. A hammock composed of a main body portion, end portions attached thereto, means for suspending the hammock, and a frame independent of said hammock and adapted to be applied thereto, said frame being adapted to underlie said main body portion and to overlie said end portions sufficiently to be supported thereby.

2. A hammock body having suitable means for suspending the same, and a frame adapted to be engaged therewith, said body having an end pocket or pockets wherein said frame may be inserted without disassembling the same, and adapted to support said frame when the hammock is suspended.

3. A hammock body having suitable means for suspending the same, and a frame adapted to be engaged therewith, said body having a plurality of transversely disposed pockets upon its under side to receive said frame without disassembling the same, and to support the same when the hammock body is suspended.

4. A hammock body having suitable means for suspending the same, and a frame independent of said body and adapted to be engaged therewith, said body having end spreaders upon the under side thereof to receive and support the end portions of said frame, the said frame underlying the main portion of said body.

5. A hammock body having suitable means for suspending the same, and a frame adapted to be engaged therewith, said body having end pockets to receive the frame without disassembling and to support the same when the hammock body is suspended, and means to secure the frame in one or both of said pockets.

6. A hammock body having suitable means for suspending the same, and a frame independent of said hammock body and adapted to be engaged therewith, said body having transverse end portions adapted to underlie the end portions of said frame and to support the same, said body end portions being constructed to permit the detachment of the frame therefrom.

7. A hammock composed of a main body portion, end portions attached thereto so as with the main portion to form pockets, said end portions having means to suspend the hammock, and a frame independent of said hammock and adapted to have its end portions inserted in said pockets, and thereby to interrupt the natural curve of the hammock and to be supported thereby when the hammock is suspended.

8. A hammock composed of a main body portion, end portions attached thereto, and having means for suspending the hammock, and a frame independent of said hammock, and adapted to be applied thereto, said frame being adapted to underlie said main body portion and to overlie said end portions sufficiently to be supported thereby.

9. A hammock composed of a main body portion, end portions attached thereto, and having means for suspending the hammock, and a frame independent of said hammock and adapted to be applied to said hammock, the said frame being adapted to underlie said main body portion and to overlie said end portions sufficiently to be supported thereby, said end portions having spreaders to receive the said frame.

10. A hammock composed of a main body portion, end portions attached thereto to provide transverse pockets having closed lateral portions, and a frame adapted to be inserted in said pockets.

11. A hammock composed of a main body portion, end portions attached thereto to provide transverse pockets having closed lateral portions, and a frame adapted to be inserted in said pockets, and means detachably to secure said frame in said pockets.

12. A hammock composed of a main body portion, end portions attached thereto and having means whereby said hammock may be suspended, said body and end portions having overlapping parts providing pockets, and a frame adapted to have its end portions inserted in said pockets and to be supported thereby when the hammock is suspended, said frame underlying said main body portion.

13. A hammock composed of a main body portion, end portions having means whereby the hammock may be suspended, the main body portion overlapping and overlying said end portions and connected thereto to provide pockets upon the under side of the hammock, spreaders applied to the overlapped parts of said end portions, and a frame adapted to be supported in said pockets.

14. A hammock composed of a main body portion, end portions attached thereto and having means for suspending the hammock, a frame independent of said hammock and adapted to be applied thereto, said frame being adapted to underlie said main body portion and to overlie said end portions sufficiently to be supported thereby, and means detachably to secure said frame in the defined, supported portion.

15. A hammock composed of a main body portion, end portions attached thereto, so as with the main portion to form pockets, means to suspend the hammock, a frame independent of the hammock and adapted to have its end portions inserted in said pockets, and hooks for detachably securing said frame in said pockets.

16. A couch hammock comprising frame supporting means, a frame independent thereof and adapted to be engaged therewith, said frame supporting means having parts adapted to underlie the ends of the frame to support the same, and suspension hooks to receive strain of hammock suspension, said hooks being applied to one of said parts and detachably connected to the other of said parts, whereby said parts are detachably connected together.

17. A couch hammock consisting of a frame, suspension ends therefor and suspension hooks to receive strain of hammock suspension, said hooks being secured both to the suspension ends and to the frame, and detachably secured to at least one of said parts, whereby said parts are detachably connected and are held in fixed relation when so connected.

18. A couch-hammock consisting of a frame, a suspension hammock end therefor and a member or members secured to one of said parts and detachably connected to the other of said parts, whereby said parts are detachably connected together.

19. A couch-hammock consisting of a frame, a flexible body portion and a member or members extending substantially longitudinally of the frame, said member or members being secured to one of said parts and detachably connected to the other of said parts, whereby said parts are detachably connected together.

20. A couch-hammock comprising frame-supporting means, a frame independent thereof and adapted to be engaged therewith, said frame-supporting means having parts adapted to underlie the ends of the frame to support the same, and a member or members applied to one of said parts and detachably connected to the other of said parts, whereby said parts are detachably connected together.

21. A couch hammock consisting of a substantially flat skeleton frame, a flexible body portion and a member or members secured to both of said parts and receiving strain of hammock suspension, said member or members being detachably secured to at least one of said parts, whereby said parts are detachably connected and are held in fixed relation when so connected.

In testimony whereof, I have signed my name to this specification, in the presence of two subscribing witnesses this 18th day of March 1911.

ISAAC E. PALMER.

Witnesses:
IRVING U. TOWNSEND,
FRED E. FOWLER.

Copies of this patent may be obtained for five cents each, by addressing the "Commissioner of Patents, Washington, D. C."